INVENTORS C. ABERT
D. E. ANDERSON
A. ZAROUNI
BY S E Hollander
ATTORNEY

May 28, 1968 C. ABERT ETAL 3,385,933

ANNOYANCE CALL TRACING ARRANGEMENT RECORDING CALLED PARTY IDENTIFICATION AND VOICE SAMPLE

Filed Jan. 21, 1965 7 Sheets-Sheet 6

3,385,933

ANNOYANCE CALL TRACING ARRANGEMENT RECORDING CALLED PARTY IDENTIFICATION AND VOICE SAMPLE

Charles Abert, Mantoloking, N.J., Donald E. Anderson, North Easton, Mass., and Alfred Zarouni, Middletown, N.J., assignors to Bell Telephone Laboratories, Incorporated, New York, N.Y., a corporation of New York Filed Jan. 21, 1965, Ser. No. 426,729
17 Claims. (Cl. 179—18)

ABSTRACT OF THE DISCLOSURE

An annoyance call tracing arrangement for tracing calls originating from within the office and from other central offices. The calling party disconnect apparatus is deactuated by a called party identification signal which is sent out by equipment partly installed at the called party's location. The equipment is actuated by dial pulses from the called party's set. The equipment at the central office records the complete called party identification and calling party trunk along with a voice sample during the call.

This invention relates to telephone systems and particularly to arrangements for enabling the origin of calls through such systems to be traced.

In a more particular aspect this invention relates to call tracing arrangements wherein instrumentalities are furnished to a customer receiving annoying calls, whereby the customer can hold these connections for the purpose of identifying the calling customer.

In telephone systems, and particularly automatic systems, it is sometimes desirable to permit a customer to hold connections to his telephone to permit a call to be traced. For example, telephone customers are occasionally seriously annoyed, insulted, and even threatened by anonymous calls and moreover, the need arises in connection with police work for determining the source of certain calls, such as bomb threats and calls of an obscene nature. While various expedients have been used in the past for tracing calls, these expedients lack certain features which we have incorporated in the present invention.

Many prior art arrangements, for example, are suitable for use in the trapping of calls originating in the same switching office as the called customer. These arrangements generally transfer control of the connection to the called customer who initiates some action to place a holding condition on the established intraoffice connection. The holding condition might consist of applying a holding potential to a control lead which is peculiar to that connection in the office to prevent the release of the local switch train.

It is well known, however, that in telephone switching conductors which control the holding of a connection are peculiar to the switch train in each individual office, and generally only the transmission conductors interconnect adjacent switching offices. Thus, on interoffice calls, the placing of a holding condition on the control conductors at the terminating office of the called party will generally not prevent the release of the originating office or any intermediate office switch trains.

It is, therefore, one object of this invention to improve call holding arrangements suitably adapted for holding both intraoffice and interoffice calls.

Also with certain of the aforementioned systems, the called party causes a special tracing signal to be placed on the control conductor at his office. This tracing signal actuates call tracing apparatus for automatically identifying at the called office the switching equipment which is engaged on the nuisance call. Of course, in those systems where only speech paths and not the control conductors extend between switching offices, it becomes impossible to trace the call back to its origin. To overcome this difficulty systems have been devised whereby the interoffice trunk is identified at the called office using the aforesaid tracing signal and the identity of the trunk is then relayed to the calling office over a special separate connection. At the calling office, the originating end of the interoffice trunk is located using the information received over the special connection from the called office. Once having located the originating end of the trunk, a similar tracing tone can be placed on a control lead at the originating office for tracing the connection to the calling party.

Accordingly, another object of our invention is to eliminate the need for establishing separate special connections between offices for tracing interoffice nuisance calls.

Many prior art nuisance call trapping arrangements also require that the called customer engage the calling customer in conversation to prevent the release of the connection while the call is being traced. The obvious disadvantage with these arrangements is that the called customer must be subjected to continuing indignities by the caller until the connection has been traced and the caller has been identified. Furthermore, the called party's telephone is necessarily disabled during tracing and the called party is unable to initiate or receive other calls.

Of course, arrangements are sometimes provided which permit the called party to put a holding condition on the nuisance call connection while freeing his line from that connection. Although a call can still be traced to its origin once the called party has released himself from the connection, it is sometimes difficult to establish which party received the call unless the called party's identity is recorded prior to his release. This is particularly disadvantageous when calls are extended through many intermediate switching offices between the calling and called customers.

Another object of our invention, therefore, is to improve call tracing facilities wherein the called party's identity is transmitted to the switching office at which the nuisance call originated.

In accordance with one illustrative embodiment of our invention the telephone line of the recipient of annoying calls is equipped with special apparatus to facilitate the tracing of nuisance calls. More specifically, associated with the called customer is a special signaling circuit under control of the called customer's station. The signaling circuit is normally disabled when calls are originated from this station and is rendered effective upon the receipt of a call. If the called party wishes to have a particular call traced he dials a special code to actuate the signaling circuit associated with his line.

The signaling circuit responds to the code dialed by the annoyed customer and transmits a series of tones back over the speech path of the nuisance call connection through any intermediate offices to the calling office. These tones comprise a nuisance call "marking" tone and a series of tones which identify the called office and the customer thereat who received the call.

At the calling office outgoing trunks are being scanned for the presence of the nuisance call "marking" tone. If the presence of the "marking" tone is detected on one of the trunks, the scanner is arranged to momentarily hold the connection while the called customer's identification tones are received from the called office and registered along with the trunk identity and the time of day on special equipment at the calling office. The connection at the calling office is further held to determine the originator of the call by manual tracing methods or through the use of automatic number identification systems.

In addition, the system is arranged to record a speech sample of the nuisance call for possible voiceprint identification.

Of course it will be realized that although one exemplary embodiment of our invention has been described with respect to the tracing of interoffice calls, the arrangement is equally suitable for tracing calls originating and terminating in the same office.

A feature of our invention resides in a call tracing arrangement wherein signals under the control of the called customer are transmitted over the nuisance call connection to the office of the calling party.

A further feature of our invention is found in a call tracing arrangement wherein the annoyed customer's identity is transmitted to the office of the calling party and registered thereat.

These and other objects and features of the invention will become readily apparent from the following description with respect to the drawing in which.

*Arrangement of equipment*

Figure 5:
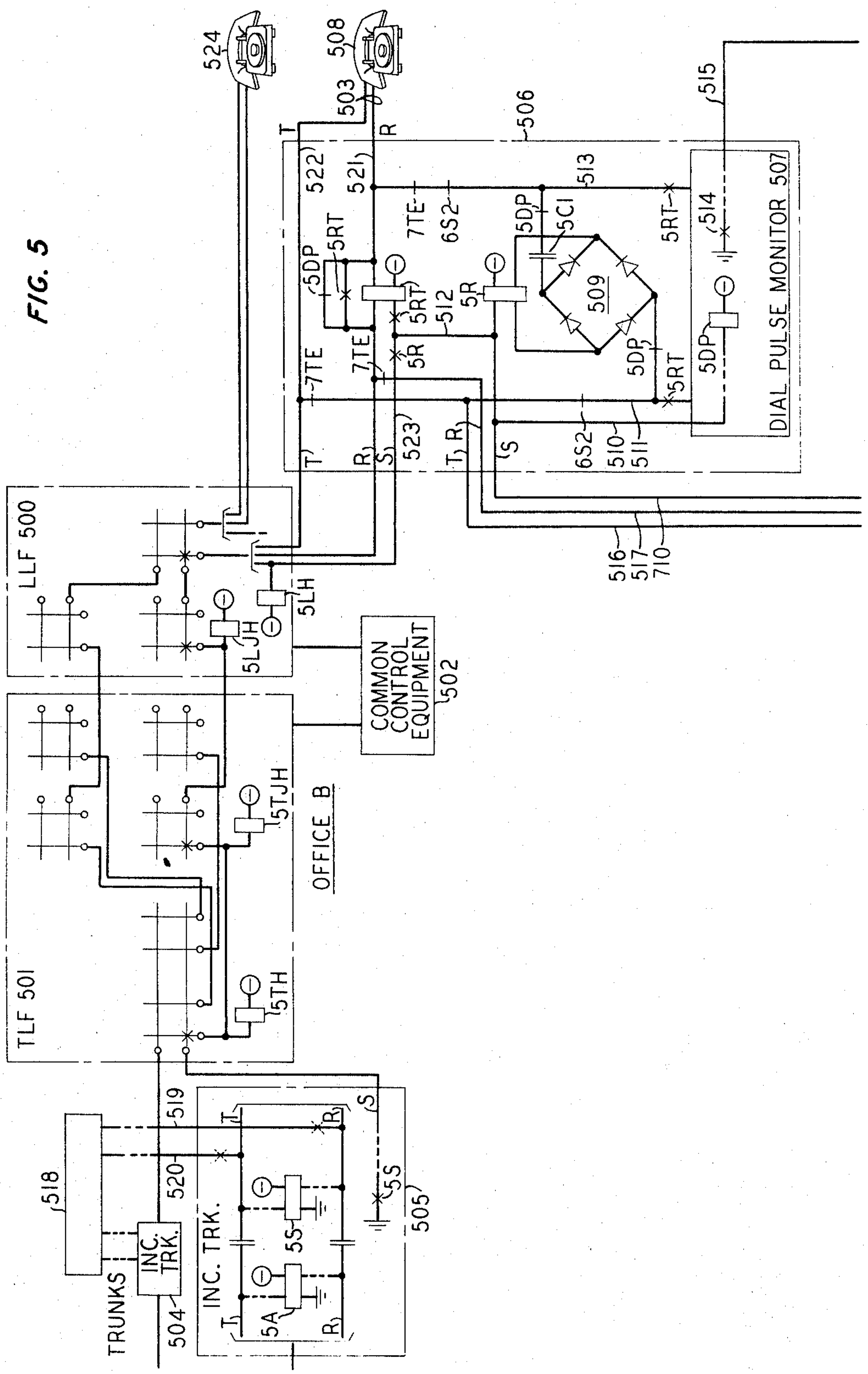
FIGS. 5–7 shows a schematic representation of the equipment associated with the customer receiving nuisance calls.

Turning first to FIG. 5 there is shown in block diagram a typical telephone switch office designated "Office B." Switching office B can be any one of the well-known types of switching offices such as step-by-step, crossbar, etc. A typical crossbar system adaptable for use with our invention is disclosed in Patent 2,585,904 to A. J. Busch of Feb. 19, 1952, and the Busch patent is hereby incorporated by reference as though fully disclosed herein.

In the Busch patent there was shown a crossbar telephone system comprising line link frames, such as frame 500, on which customer lines appear, trunk link frames, such as frame 501, on which trunks from other offices appear, and common control equipment 502 for establishing communication paths between the lines and trunks. While it is to be understood that switching office B serves many customer lines and trunks, only trunks 504 and 505, and customer lines 503 and 524 have been shown to simplify the drawing.

Customer line 503 would normally be connected directly to line equipment on line link frame 500. However, it is to be assumed that the customer served by line 503 has been receiving threatening calls from an unknown source and wishes to have these calls traced. Customer line 503 is therefore furnished with a call trapping initiator circuit generally indicated by block 506.

The initiator circuit comprises a dial pulse monitor circuit 507 for recognizing the dial pulses transmitted over line 503 from station 508, and relay circuitry to render the dial pulse monitor effective only on calls incoming to line 503.

Dial pulse monitor 507 comprises a loop pulse detector circuit which can be coupled to a customer's line without interfering with the normal operation of that line. Many such loop pulse detectors are known in the prior art, and an example of one such detector can be found in Patent 2,580,069 to F. E. Blount of Dec. 25, 1951. It is to be understood that the Blount patent is hereby incorporated by reference as though fully disclosed herein.

Figure 6:
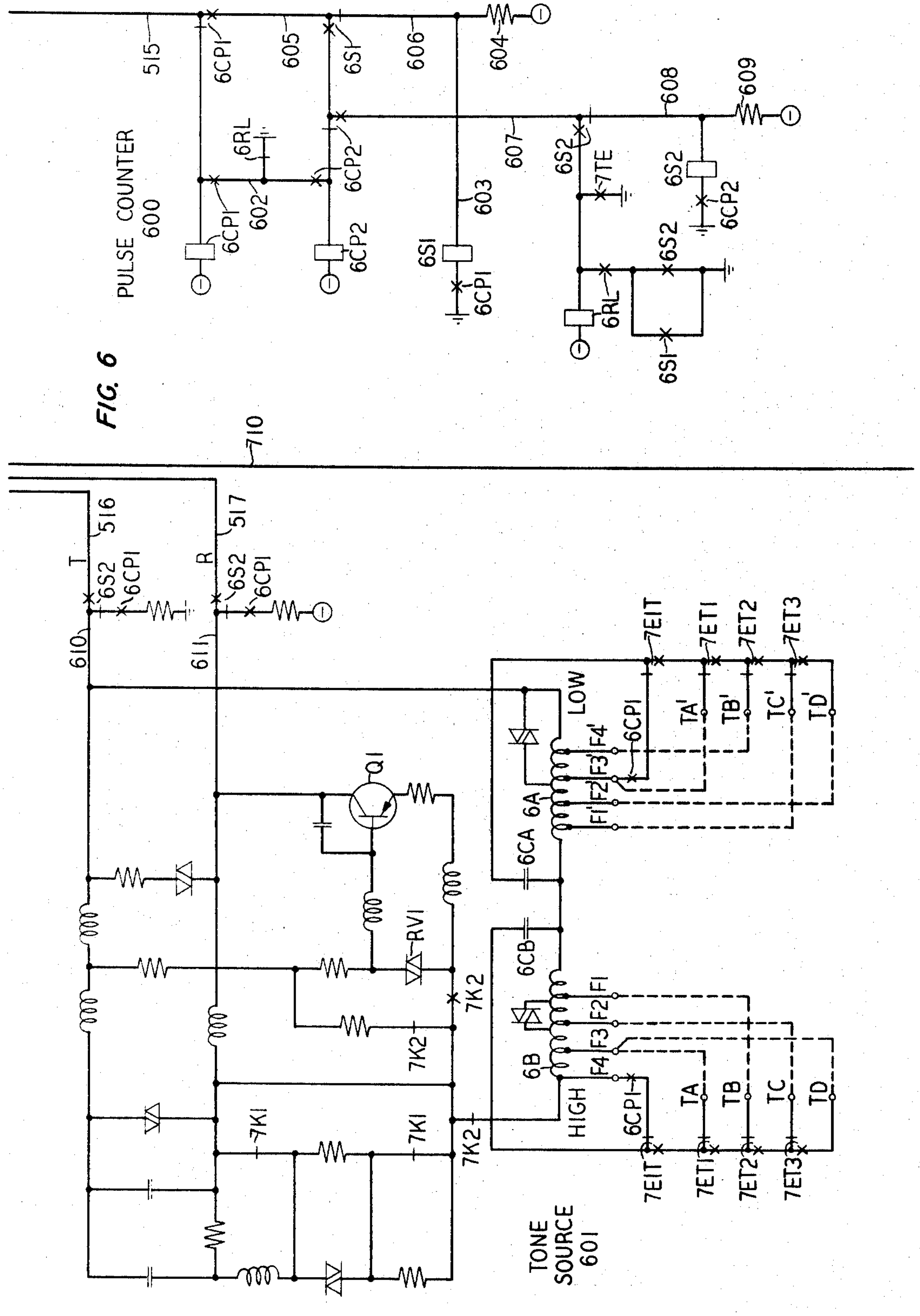
Figure 8:
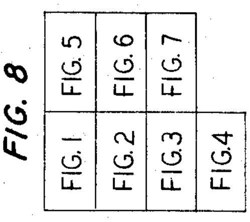
FIG. 8 shows the arrangement of FIGS. 1–7.

Dial pulse monitor circuit 507 is connected to a pulse counter circuit 600 shown in the right-hand portion of FIG. 6. As mentioned above, the called customer must dial a special code to initiate the tracing action and pulse counter 600 is arranged to respond to this code.

Figure 7:
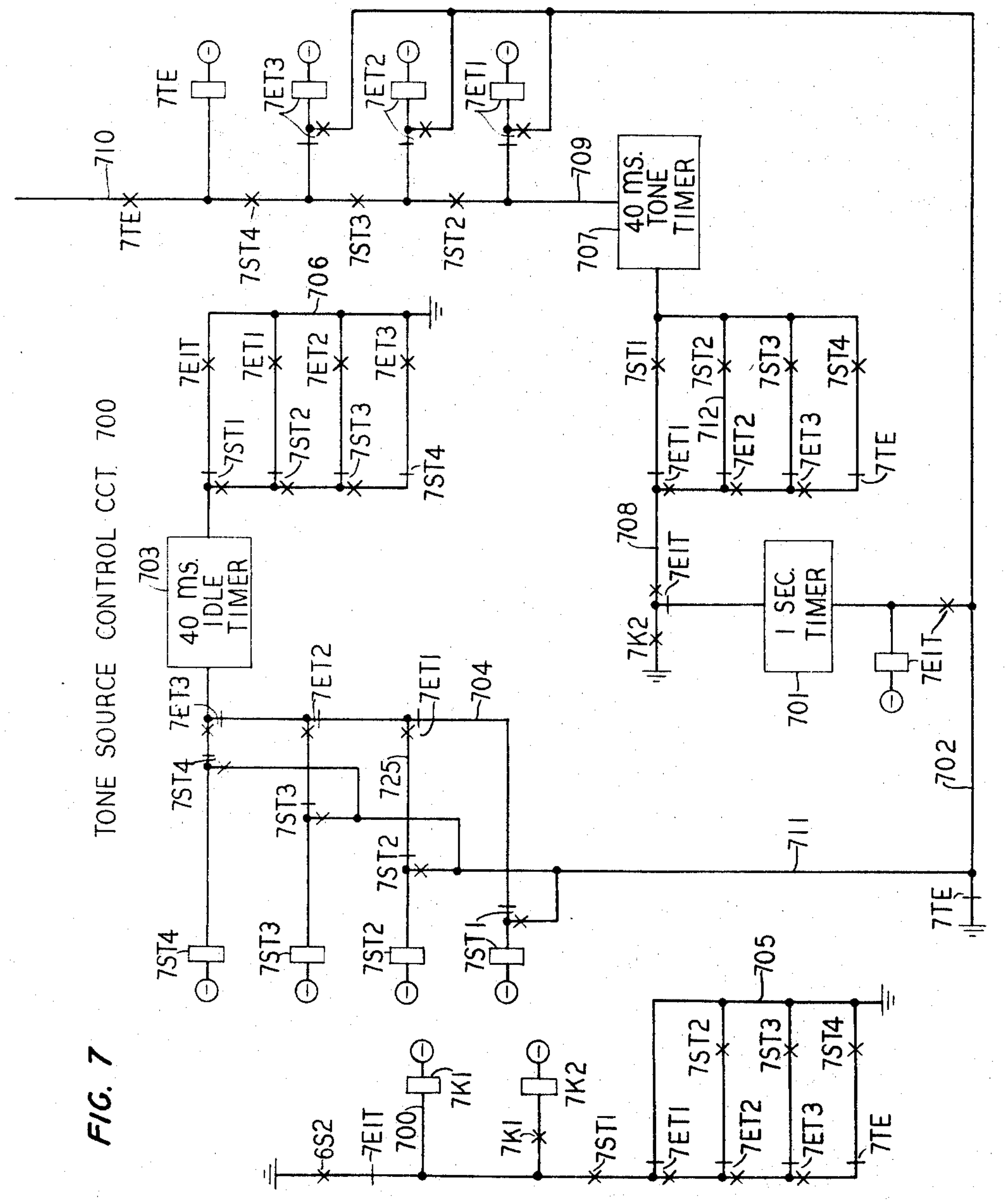

Also shown in FIG. 6 is tone source 601. Tone source 601 comprises a transistor oscillator adapted to generate a plurality of frequencies under control of tone source control circuit 700 in FIG. 7. A typical tone source suitable for use in our invention is disclosed in the copending application of L. A. Meacham and F. West, Ser. No. 759,474, filed Sept. 8, 1958, now Patent 3,184,554, issued May 18, 1965, and is also described in an article by J. H. Ham and F. West in vol. 82 of the IEEE Transactions on Communications and Electronics, pages 17–24 (1963). Both the Meacham et al. application and the Ham et al. article are hereby incorporated by reference as though fully disclosed herein.

As discussed in the article by Ham and West the transistor oscillator is adapted to furnish signals from a 4 by 4 code, that is, two simultaneous frequencies comprising one frequency out of a group of four in a group called the "high group" and one frequency out of a group of four from a "low group." Two-frequency operation is accomplished by coupling capacitors 6CA and 6CB across different windings of transformers 6A and 6B under control of the contacts of relays 7ET–, and the operation of relays 7ET– will be described subsequently.

Figure 1:
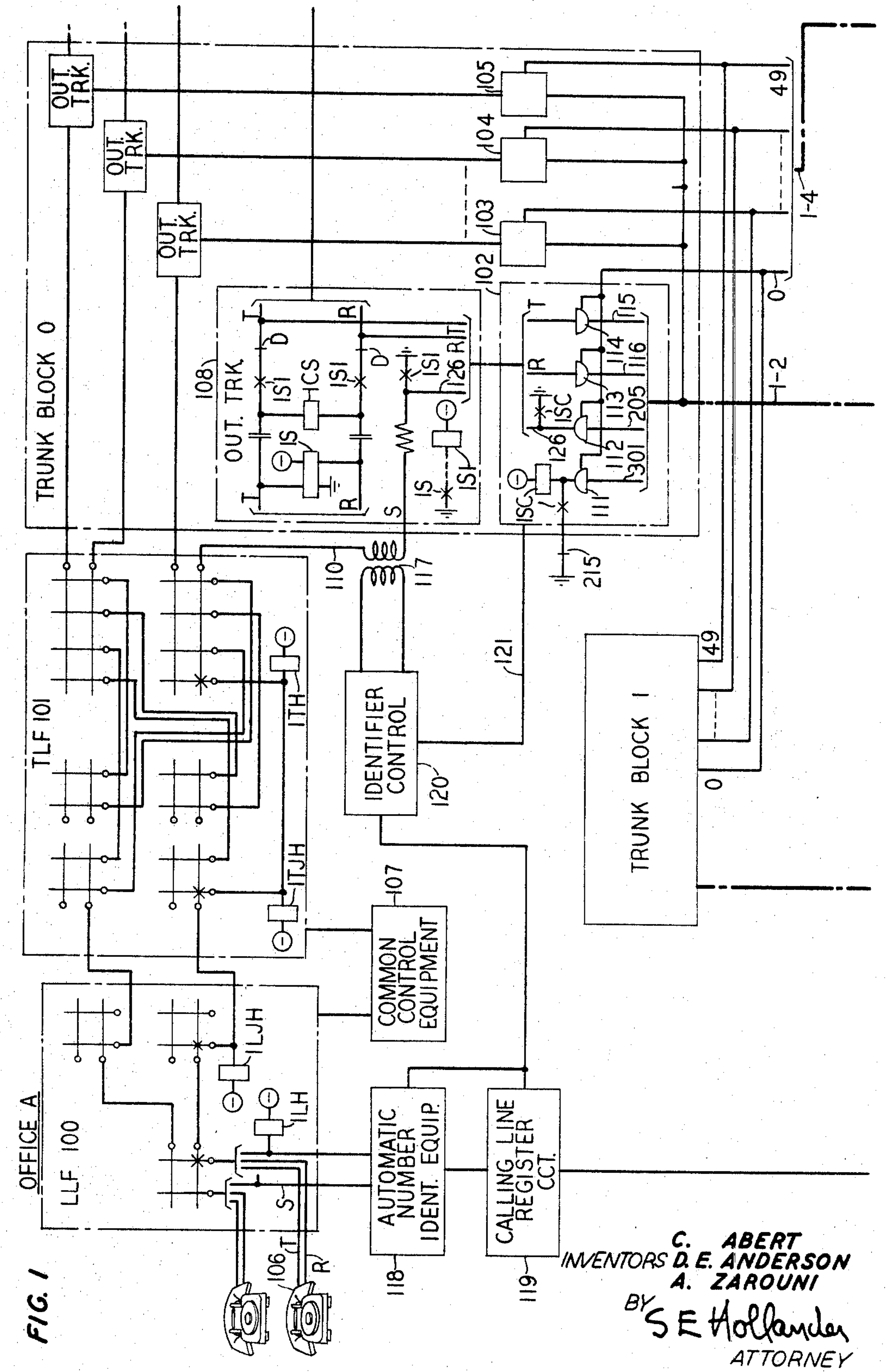
FIGS. 1–4 depict a schematic representation of the equipment associated with customers from which nuisance calls are thought to be originated.

Turning now to FIG. 1 there is shown a block diagram for a telephone switching office designated A. For ease of illustration it has been assumed that office A is a crossbar office similar to office B in FIG. 5 and more fully disclosed in the aforementioned Busch patent.

For aiding in the identification of nuisance calls, the trunks originating at the office A are divided into "trunk blocks" each comprising fifty trunks. Each trunk has associated therewith gate circuits generally represented by the block diagrams 102–105 and these gate circuits are effective when enabled for extending certain conductors from each trunk in a trunk block to a common receiving circuit in FIG. 2. The trunks in trunk block O are coupled to receiving circuit 200, while the trunks in trunk block 1 are coupled to receiving circuit 201 which is assumed to be identical to receiving circuit 200.

Receiving circuit 200 can be any one of well-known circuits such as the receiver circuit disclosed in Patent 3,128,349 to F. T. Boesch et al. of April 7, 1964, and the Boesch et al. patent is hereby incorporated by reference as though fully disclosed herein.

As set forth in the Boesch et al. patent the receiver circuit receives signals generated in accordance with the so-called 4 by 4 code. The coded signals comprise selected combinations of coincident two-tone bursts, and each combination comprises one tone from a relatively high group of frequencies and one tone from a relatively low group of frequencies. The signals are received, amplified, and separated into their respective high and low groups. In each group, a tuned circuit corresponding to the received frequency responds to operate a detector. A check is made to determine the presence of one and only one frequency in each of the two groups, and if a valid check is made, direct-current signals are forwarded over one-out-of-four of the high group and one-out-of-four of the low group output leads to a suitable register circuit.

Figure 2:
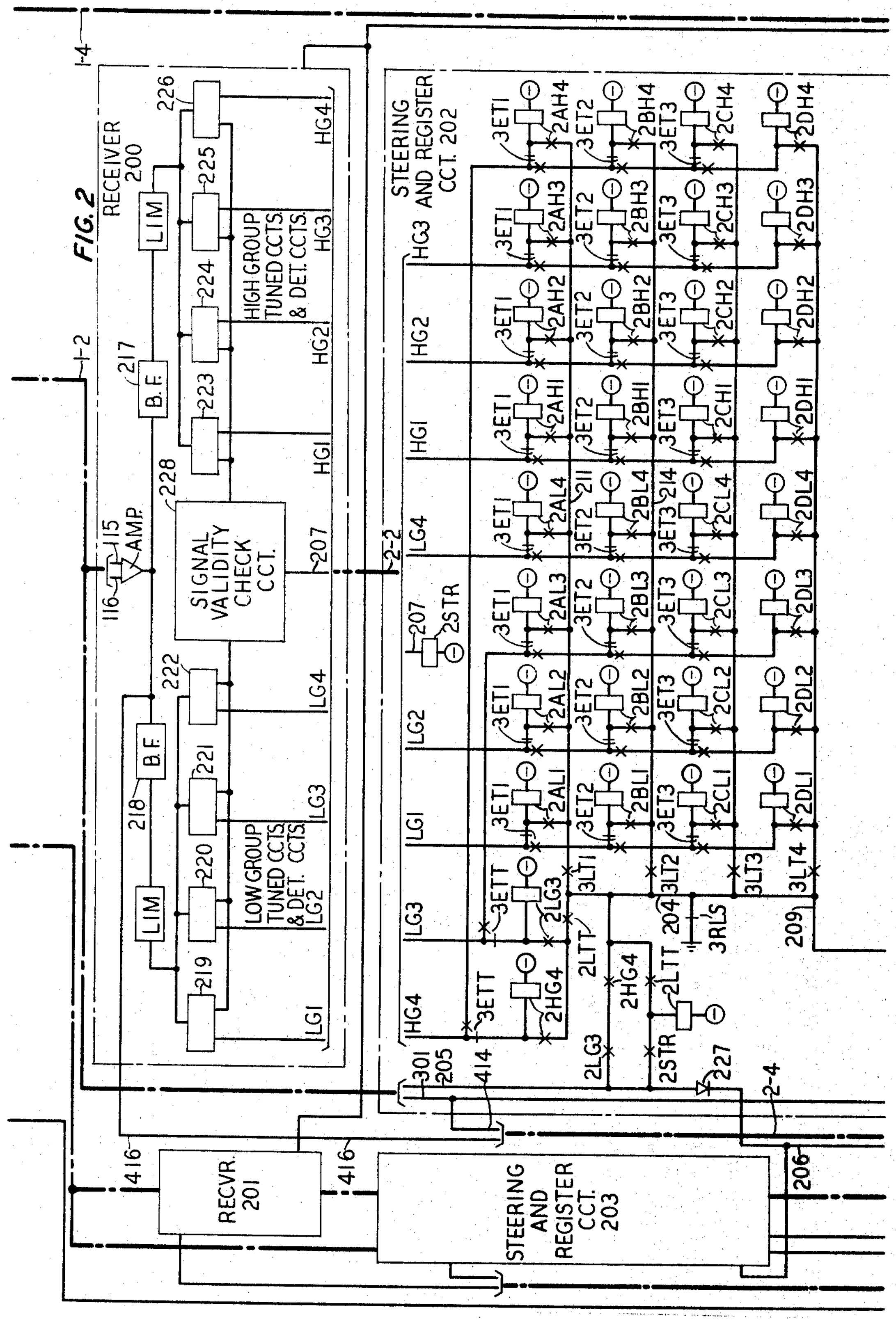
Figure 3:
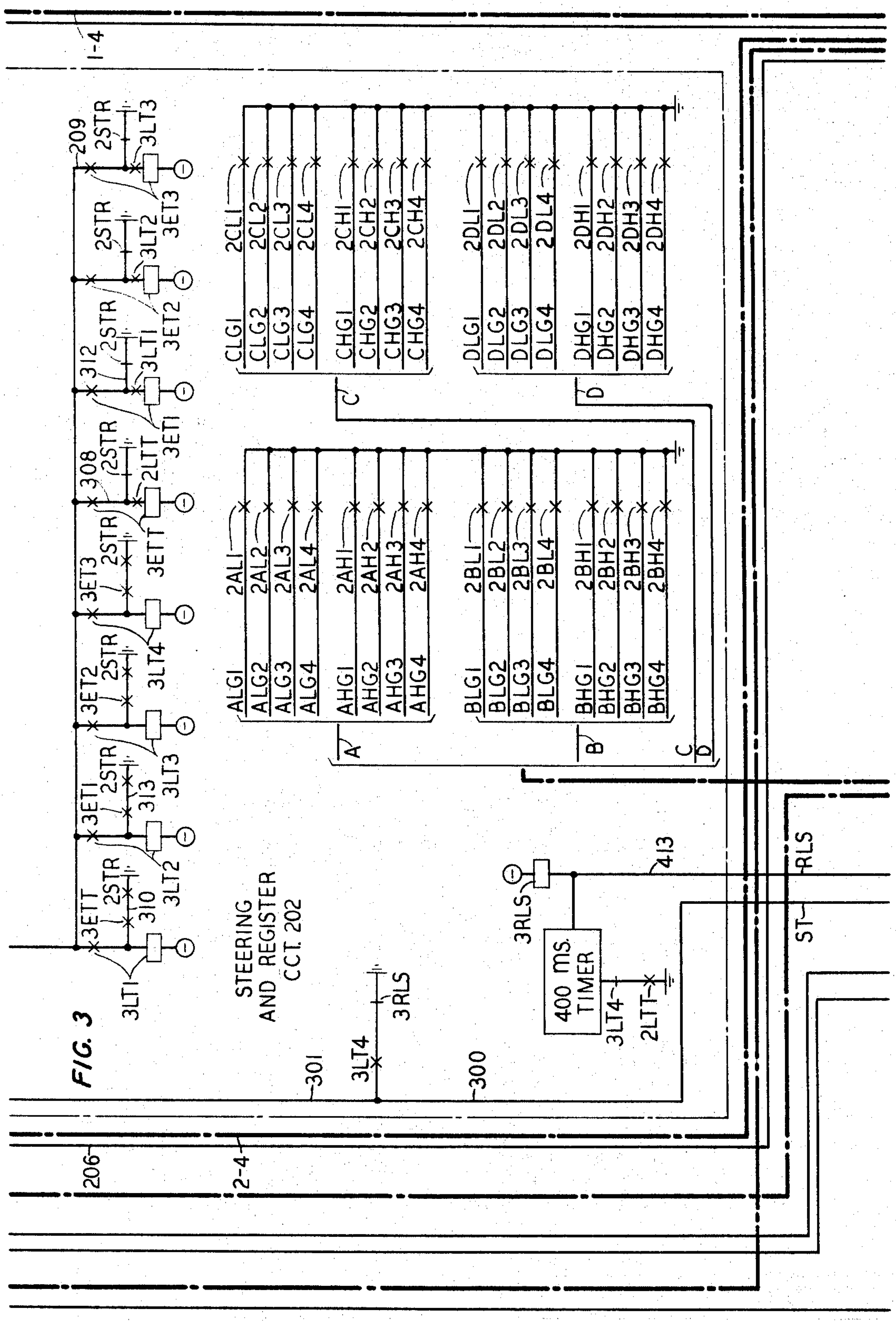

The steering and register circuit 202 associated with receiver 200 in the instant arrangement has been depicted in FIGS. 2 and 3 and register circuit 202 functions to store the digits transmitted over a nuisance call connection under the control of the called customer.

When the identity of a customer receiving nuisance calls has been registered in register circuit 202 the register circuit bids for access to recording apparatus for making a more permanent record of the information on a tape or other suitable media. This apparatus for recording nuisance call information has been shown in FIG. 4 and is generally indicated by the block diagram designated Call Identity Recorder 400. The Call Identity Recorder 400 may be used by many trunk blocks in many offices and comprises a printer 402 under control of a printer control circuit 403. The printer can be any suitable mechanism for providing punched cards, perforated tape, or printed copy of information pertaining to the identity of the nuisance call. Apparatus suitable for use with our invention is well known and examples can be found in Patent 2,558,477 to J. W. Gooderham et al. of June 26, 1951, and Patent 2,447,533 to J. B. Retallack of Aug. 24, 1948. The Gooderham et al. and Retallack patents are hereby incorporated by reference as though fully disclosed herein.

The identity recorder also comprises a register circuit 404 which includes a circuit for recording the time of day and circuitry for registering, prior to printing by printer 402, the trunk block and trunk number and the number of the customer who received the nuisance call.

Figure 4:
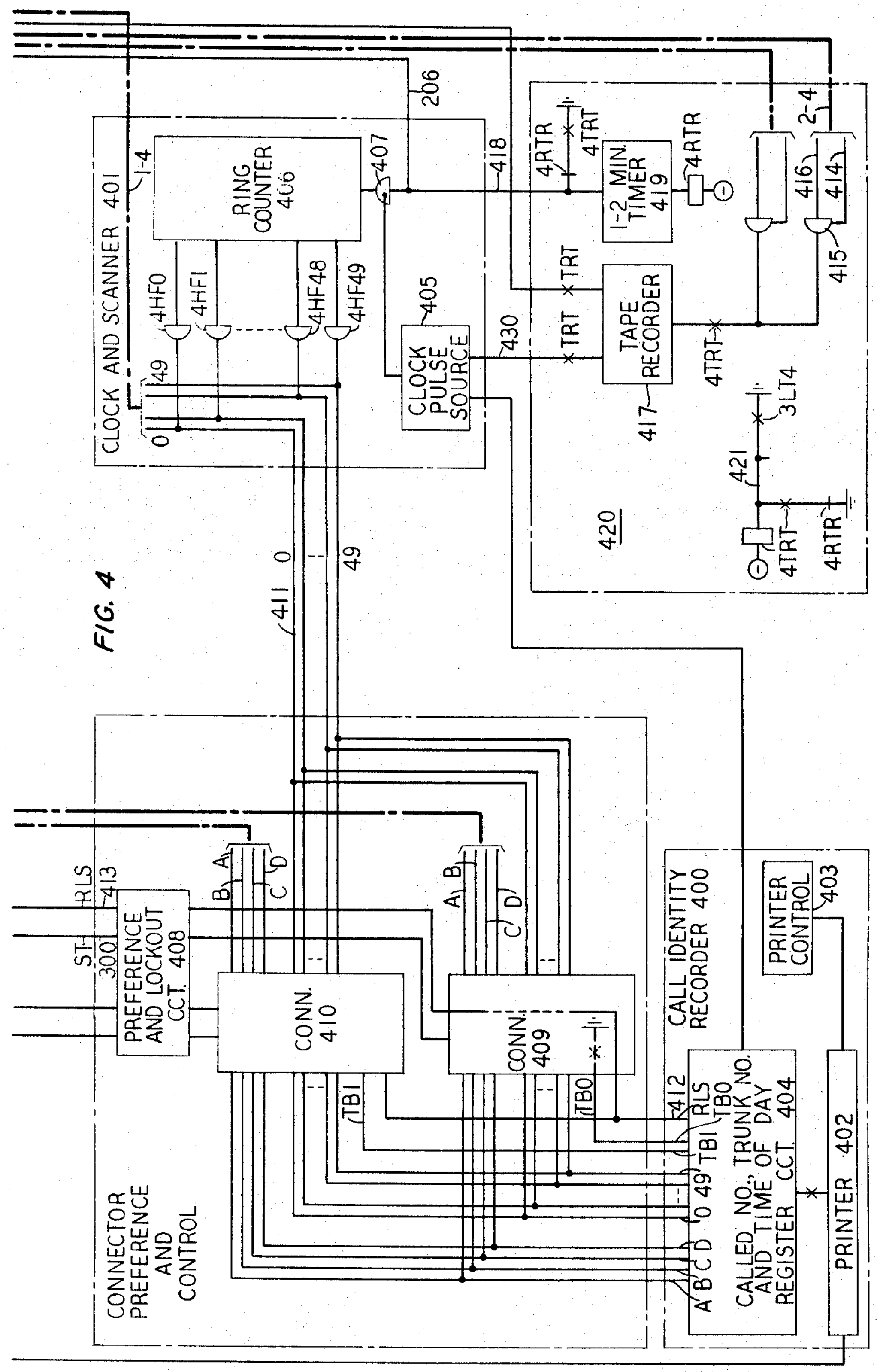

Also shown in FIG. 4 is appropriate recording apparatus generally indicated by the block diagram 420 for sampling the coversation of a nuisance call for possible voiceprint identification.

*Detailed description*

To illustrate the over-all operation of the invention contemplated, a detailed description will now be given assuming that customer 508, served by switching office B, has received an annoying call from customer 106 served by switching office A.

While customers 508 and 106 are shown to be served by adjacent switching offices A and B, it is obvious that offices A and B might be separated by many intermediate switching offices, or on the other hand, customers 106 and 508 might be served by the same local office without departing from the spirit and scope of the instant invention.

When customer 106 at office A initiated a call to customer 508 at office B the common control equipment 107 selected an idle outgoing trunk to office B such as trunk circuit 108 in trunk block O. Having selected the trunk the called customer's telephone number was outpulsed over the trunk to the common control equipment in office B and the tip, ring and sleeve conductors associated with customer 106 were connected over a channel to the tip, ring and sleeve conductors of trunk circuit 108.

To simplify the drawing only a single line representing the sleeve conductor of the channel has been shown at office A, and it will be realized that the tip, ring and other conductors may be extended between the line and trunk by the actuation of the crossbar switches on line link frame 100 and trunk link frame 101.

It was shown in the aforementioned Busch patent that the sleeve conductor controlled the release of the channel by maintaining appropriate hold magnets operated on each of the switch frames. More specifically, when the customer at station 106 has his receiver off hook a loop circuit is completed over the tip and ring for operating calling supervisory relay 1S in trunk circuit 108. Relay 1S, in operating, operates relay 1S1 which places ground on sleeve lead 110 of the established channel. This ground is extended through operated crosspoints on each of the switches of the line link and trunk link frames to maintain the connection by maintaining operated trunk hold magnet 1TH and trunk junctor hold magnet 1TJH on the trunk link frame and line junctor magnet 1LJH and line hold magnet 1LH on the line link frame.

Seizure of the outgoing trunk equipment 108 at office A results in the corresponding actuation of incoming trunk circuit 505 at office B, and trunk circuit 505 bids for service by common control equipment 502. Common control equipment 502 responds to the called number outpulsed from office A, and a channel is established between incoming trunk circuit 505 and the called customer's station 508. As in FIG. 1, the channel circuit shown in FIG. 5 has been simplified to show only the sleeve or control conductor thereat and it is to be understood that the tip, ring, and other conductors may extend between the trunk and subscriber in office B.

When the channel has been completed between incoming trunk circuit 505 and station 508, trunk circuit 505 applies a ringing signal from source 518 over the channel to signal the customer at station 508. Under normal circuit operation only the customer's station ringer would be actuated. In the example under consideration, however, customer 508 has been receiving nuisance calls, and to permit him to trap these calls, a nuisance call initiator circuit 506 has been coupled to this line.

Nuisance call initiator circuit 506 is adapted to disable the nuisance call tracing apparatus when the customer at station 508 initiates calls and to render the tracing apparatus effective when the customer at station 508 receives calls. More specifically, when the interrupted ringing signal from source 518 is applied by trunk 505 over the channel to the customer's line, a circuit is completed for operating relay 5R through its lower winding. This circuit can be traced from a high voltage alternating current source which is connected over conductor 519 to the ring of the trunk, over the ring conductor (not shown) of the channel on frames 500 and 501 to nuisance call initiator circuit 506, through normal contacts of relay 5DP, normal contacts of relay 7TE, normal contacts of relay 6S2, and normal contacts of relay 5DP, through capacitor 5C1 through the full wave rectifier 509, through the lower winding of relay 5R, and normal contacts of relay 5DP, back over conductor 511, through normal contacts of relay 6S2, and normal contacts of relay 7TE to the tip conductor (not shown) of the channel, and to ground over conductor 520 from the ringing source 518.

Relay 5R, in operating during the first ringing interval, locks over a circuit traced from battery through its upper winding over conductor 512 and through its own operated contacts to ground on the sleeve conductor of the channel. Relay 5R in operating also extends the sleeve ground over conductor 510 to operate relay 5DP in dial pulse monitor circuit 507.

The dial pulse monitor 507 is a loop pulse detector circuit which will respond to small direct-current changes in the called customer's loop as a result of the customer at station 508 actuating his dial.

When relay 5DP operates it disconnects the full wave rectifier 509 and the lower winding of relay 5R from customer line 503 and opens its contacts to remove the shunt from around the upper winding of ringing trip relay 5RT so that this winding of relay 5RT is now inserted in the called customer's loop. Relay 5RT, however, does not operate at this time due to the high impedance condition of the called customer's line prior to lifting the receiver at station 508.

The customer at station 508 responds to the ringing signal by lifting his receiver and completes a low impedance circuit for operating relay 5S in the trunk and ringing trip relay 5RT in nuisance call initiator circuit 506. This circuit can be traced from battery through the lower winding of relay 5S, over the ring conductor (not shown) of the channel, through the upper winding of relay 5RT, over the ring conductor 521 of customer line 503, through the station equipment 508, back over the tip conductor 522 of customer line 503 and the tip conductor (not shown) of the channel connecting station 508 with incoming trunk 505 and to ground through the upper winding of relay 5S. Relay 5S, in operating, connects ground to the sleeve lead permitting the customer at station 508 to assume control of the connection in office B, and relay 5RT, in operating, locks from a circuit traced from battery, through its lower winding through its own contacts to ground on the sleeve conductor 523 of the channel. Relay 5RT also connects the station 508 tip and ring conductors to dial pulse monitor 507.

The customer at station 508 can now converse with the customer at station 106, and if the customer at station 508 wishes to trap or hold the connection he must dial a special code to actuate the call tracing apparatus.

Let it now be assumed that customer 508 wishes to hold the connection from customer 106, and that customer 508 dials the digit "2" to actuate the call tracing apparatus. Dial pulse monitor 507 is coupled to the called subscriber's loop over conductors 511 and 513, and dial pulse monitor 507 responds to each dial pulse by applying ground through its contacts 514 and over conductor 515 to pulse counter 600 in FIG. 6.

Upon receipt of the first dial pulse, ground on conductor 515 operates relay 6CP1. Relay 6CP1 in operating locks through its own operated contacts, over conductor 602 and to ground through normal contacts of relay 6RL. Relay 6CP1 also connects battery and ground to conductors 610 and 611 to prepare the oscillator in tone source 601 for operation. Subsequently, when tone source 601 is transmitting a sequence of tones over the nuisance call connection the transistor oscillator will be powered from the source supplying the talking battery through the windings of relay 5S to customer 508.

The operation of relay 6CP1 connects each of the tuning capacitors 6CA and 6CB across the tuning coils 6A and 6B, respectively, to prepare the oscillator for transmitting the nuisance call marking tone. More specifically, capacitor 6CB is connected to terminal F4 and capacitor 6CA is connected to terminal F3′ so that frequencies F4 in a low group and F3′ in the high group will be transmitted.

Frequencies F4 and F3′ have been chosen as the tone for "marking" a nuisance call, that is, the tone which will be detected when the outgoing trunks are scanned at the calling office. It will be realized, of course, that any combination of signals could be used for marking a nuisance call as long as the signals are not used for other purposes which might cause erroneous detection by the scanner.

Relay 6CP1 also prepares an operating circuit for relay 6S1. This circuit can be traced from ground, through operated contacts of relay 6CP1, through the winding of relay 6S1, over conductor 603 and through resistance 604 to battery. Relay 6S1 does not operate, however, since ground over conductor 515 from the dial pulse monitor 507 is extended through operated contacts of relay 6CP1, over conductor 605, through normal contacts of relay 6S1 and over conductor 606 to shunt relay 6S1 for the duration of the first dial pulse. At the cessation of the first dial pulse the shunt is removed and relay 6S1 operates.

Upon the receipt of the next dial pulse ground is again closed through contacts 514 in dial pulse monitor 507, over conductor 515, through operated contacts of relay 6CP1, over conductor 605, through operated contacts of relay 6S1, normal contacts of relay 6CP2 and through the winding of relay 6CP2 to battery, operating relay 6CP2. Relay 6CP2 operates and locks through its own contacts and normal contacts of relay 6RL to ground.

Relay 6CP2 also extends ground through its contacts, through the winding of relay 6S2 and through resistance 609 to battery to prepare an operating circuit for relay 6S2. Relay 6S2 does not operate at this time, however, since the ground from dial pulse monitor 507 which operated relay 6CP2 is now extended through operated contacts of relay 6CP2, over conductor 607, through normal contacts of relay 6S2, over conductor 608 to shunt relay 6S2. At the cessation of the second dial pulse this ground is again removed by dial pulse monitor 507 to permit relay 6S2 to operate.

When relay 6S2 operates it actuates its transfer contacts and connects the tone source 601 to the nuisance call connection through conductors 610, 611, 516 and 517. In operating, relay 6S2 also completes a circuit for operating relay 7K1. This circuit can be traced from battery, through the winding of relay 7K1, over conductor 700, through normal contacts of relay 7EIT and through operated contacts of relay 6S2 to ground. Relay 7K1 operates and completes an obvious operating circuit for relay 7K2.

When relay 7K2 operates, the direct current through the tuning coils 6A and 6B is interrupted causing shock excitation of the two tuned circuits and the transmission of the nuisance call marking signal comprising frequencies F4 and F3′ back over the nuisance call connection to the calling office. The nuisance call marking signal will be detected by receiver 200 at the calling office in FIG. 2 and will result in a subsequent registration of the called customer's identification, but before describing the operations of the equipment at the calling office a description will be given of the transmission of the remaining signals which identify the called party.

With relay 7K2 operated and the marking signal comprising frequencies F4 and F3′ being transmitted over the nuisance connection a circuit is completed for operating relay 7EIT after a one-second delay. This circuit can be traced from ground, through operated contacts of relay 7K2, normal contacts of relay 7EIT, through one-second timer 701 and through the winding of relay 7EIT to battery. The one-second delay timer 701 assures that the marking signal will be on the connection for a minimum interval to permit the scanner at the calling office to scan all trunks in a group for the presence of the marking tone.

Relay 7EIT, in operating, interrupts the operating circuit for relays 7K1 and 7K2 and relays 7K1 and 7K2 release to remove the marking tone (F4 and F3′) from the nuisance connection. The call tracing apparatus associated with the called line is now prepared for transmitting signals for identifying the called customer. In this one illustrative embodiment of the invention the signals comprise four bursts of tone wherein each burst comprises one frequency from the high group, and one frequency from the low group as determined by the cross-connections between the "T–" punchings and the "F–" punchings in FIG. 6. Each burst of tone representing a digit is applied to the connection for about 40 milliseconds and the tones are spaced apart by 40-millisecond silent intervals.

The combination of four digits identifies the customer at station 508. While all four digits may be used to signify the telephone number associated with station 508, some of the digits may represent the office designation of the called office (office B) serving customer 508. In this one specific embodiment we have assumed that the calling and called customers are served by different telephone switching offices and therefore the called office must be identified. The first two digits to be transmitted to the calling office have been assumed to represent local office B and the last two digits of the four-digit sequence have been assumed to represent customer 508 served by local office B.

Of course, the number of digits to be transmitted can be varied depending on the size of the area being served and the number of customers requiring call tracing arrangements.

Let it be assumed, that the digits "4" and "3" have been assigned to identify the office B. Turning now to FIG. 6 it can be seen that punching TA and TA′ on tone source 601 will be cross-connected to punchings F3 and F3′, respectively, for the digit 4, and punchings TB and TB′ will be cross-connected to punchings F1 and F4′ for the digit 3.

Similarly, if the digits "0" and "7" have been assigned to represent customer 508 in office B, punchings TC and TC′ would be cross-connected to punchings F2 and F1′ for the digit 0, while punchings TD and TD′ will be cross-connected to punchings F3 and F2′ for the digit 7.

Of course, it will be realized that the call tracing apparatus for other customers served by local office B would be arranged to transmit the office B digits "43" followed by two digits representative of the other customers, and similarly, the call tracing apparatus for customers served by other offices would be arranged to transmit a two-digit office code representative of those offices.

Returning now to the call being described, it will be recalled that customer 508 dialed the digit "2" to actuate the call tracing apparatus associated with his line. In response to the digit 2 a nuisance call marking tone of one-second duration was transmitted back over the nuisance call connection to the calling office by tone source 601 and relay 7EIT operated at the end of the one-second interval to remove marking tone.

Relay 7EIT, in operating, locks to ground over conductor 702 and through normal contacts of relay 7TE, and in addition, relay 7EIT couples tuning capacitors 6CB and 6CA across tuning coils 6B and 6A in tone source 601, so that upon a subsequent actuation of relays 7K1 and 7K2 the frequencies F3 and F3′ representing the digit 4 will be transmitted.

Relay 7EIT also completes a circuit for operating start tone relay 7ST1 after a 40-millisecond delay to permit the receiver at the calling office to prepare for receipt of the identification signal. This circuit can be traced from ground on conductor 706, through operated contacts of relay 7EIT, through normal contacts of relay 7ST1, through the 40-millisecond idle timer generally indicated by block 703, through normal contacts of relays 7ET3, 7ET2, 7ET1, over conductor 704 and through the normal contacts and the winding of relay 7ST1 to battery, operating relay 7ST1.

Relay 7ST1 in operating after the 40-millisecond delay removes the ground from the 40-millisecond idle timer 703 thereby recycling that timer and relay 7ST1 also completes a circuit for operating relay 7K1. This circuit can be traced from ground on conductor 705, through normal contacts of relay 7ET1, operated contacts of relay 7ST1, over conductor 700 and through the winding of relay 7K1 to battery. Relay 7K1, in operating, completes an obvious operating circuit for relay 7K2.

It will be recalled from the description with respect to the transmission of the marking tone that when relays 7K1 and 7K2 operated, the oscillator Q1 in tone source 601 was triggered to transmit the tone in accordance with the coupling of capacitors 6CB and 6CA across tuning coils 6B and 6A, respectively. With relay 7EIT operated, capacitors 6CB and 6CA are coupled in such a manner that a tone burst comprising frequencies F3 and F3′ (which represent the digit 4) will be transmitted back over the nuisance call connection to the calling office.

When relay 7K2 operates a circuit is prepared for operating end of tone relay 7ET1 to terminate the tone representing the first digit and prepare the circuit for transmitting tones representing the other digits. The circuit for operating relay 7ET1 can be traced from ground, through operated contacts of relays 7K2 and 7EIT, over conductor 708, through normal contacts of relay 7ET1, through operated contacts of relay 7ST1, through 40-millisecond tone timer 707, over conductor 709 and through the normal contacts and the winding of relay 7ET1 to battery. Relay 7ET1 operates and locks through its own contacts to ground on conductor 702. Relay 7ET1, in operating, also interrupts the operating circuit for relays 7K1 and 7K2. Relays 7K1 and 7K2 release, removing the tone comprising frequencies F3 and F3′ from the connection. In addition, relay 7ET1 disconnects the ground on conductor 708 from the 40-millisecond tone timer 707 to reset that timer and relay 7ET1 prepares a path through the 40-millisecond idler timer 703 for operating the next tone start relay 7ST2. The operating circuit for relay 7ST2 can be traced from ground on conductor 706, through operated contacts of relay 7ET1 through normal contacts of relay 7ST2, operated contacts of relay 7ST1, through 40-millisecond idle timer 703, through normal contacts of relays 7ET3 and 7ET2, through operated contacts of relay 7ET1, over conductor 725 and through the normal contacts and the winding of relay 7ST2 to battery, operating relay 7ST2 after a 40-millisecond delay as determined by timer 703.

Furthermore, relay 7ET1, in operating, connects capacitors 6CB and 6CA across tuning coils 6B and 6A for transmission of the second digit "3" as determined by the cross-connections from punchings TB and TB′ to punchings F1 and F4′, respectively. Having prepared tone source 601 for transmitting frequencies F4 and F4′ start relay 7ST2 will now cause the transmission of the second tone burst.

When relay 7ST2 operates it completes a circuit for operating relay 7K1. This circuit can be traced from ground on conductor 705, through operated contacts of relay 7S2, through normal contacts of relay 7ET2, through operated contacts of relays 7ET1 and 7ST1, over conductor 700 and through the winding of relay 7K1 to battery. Relay 7K1 operates completing an obvious operating circuit for relay 7K2 which causes the transmission of the second tone burst over the nuisance call connection.

Relay 7K2, in operating, prepares a circuit for operating end of tone relay 7ET2 under the control of 40-millisecond tone timer 707. This circuit can be traced from ground, through operated contacts of relays 7K2 and 7EIT, over conductor 708, through operated contacts of relay 7ET1, normal contacts of relay 7ET2, conductor 712, operated contacts of relay 7ST2 to tone timer 707, over conductor 709, through operated contacts of relay 7ST2 and through normal contacts and the winding of relay 7ET2 to battery. Relay 7ET2 operates and locks through its own contacts to ground on conductor 702.

Relay 7ET2, in operating, removes the ground on conductor 708 from the 40-millisecond tone timer 707 thereby resetting that timer and relay 7ET2 connects ground from conductor 706 to the 40-millisecond idle timer 703 in preparation for operating relay 7ST3 and the transmission of the third tone burst representing the first digit assigned to the annoyed customer. Relay 7ET2 also transfers the tuning capacitors 6CA and 6CB to different windings of tuning coils 6A and 6B in preparation for transmitting the digit "0" comprising frequencies F1 and F1′.

The transmission of the digits "0" and "7" assigned to customer 508 is accomplished under control of relays 7ST3, 7ST4, 7ET2 and 7ET3 and the timing circuits 703 and 707 in the same manner that digits "4" and "3" identifying office B were transmitted under control of the relays described above and need not be described in detail for a complete understanding of our invention. Instead, let it be assumed that the digit "0" has been transmitted and the digit "7" is now being transmitted as a result of the shock excitation of oscillator Q1 by relays 7K1 and 7K2 with relay 7ET3 operated.

With relay 7K2 operated ground is once again connected over the conductor 708, through operated contacts of relays 7ET1–7ET3, through normal contacts of relay 7TE, operated contacts of relay 7ST4, through tone time 707, over conductor 709, through operated contacts of relays 7ST2–7ST4 and through the winding of relay 7TE to battery. After a 40-millisecond delay measuring the interval of time that the digit "7" tone burst is applied to the nuisance call connection, relay 7TE operates and locks through its own contacts to ground on sleeve conductor 710.

In operating, relay 7TE interrupts the operating circuit for relays 7K1 and 7K2 and these relays release removing the digit "7" tone from the nuisance call connection. In addition, relay 7TE removes the locking ground from conductors 702 and 711 to release relays 7EIT, 7ET1–7ET3, and relays 7ST1–7ST4 which were held operated to ground on those conductors.

The tone source control circuit 700 has now been restored to normal except for relay 7TE which is held operated to the sleeve ground on conductor 710. It will be noted that relay 7TE is held operated to ground on sleeve conductor 515 for the duration of the call to prevent reactivation of the tone source and control circuit until after customer 508 has disconnected from the nuisance call connection.

Thus, at this point in the call the called customer 508 has dialed the code "2" to actuate the call holding apparatus in office B. In response to the digit "2," pulse counter 600 causes a nuisance call marking tone (F4 and F3') to be transmitted over the nuisance call connection to the calling office. Following the 1-second marking tone, two digits ("4" and "3") representing office B and two digits ("0" and "7") representing customer 508 were transmitted over the connection to the calling office under control of the tone source control circuit 700. Each of the digits comprised a two-frequency tone burst of 40-millisecond duration followed by a 40-millisecond silent interval to permit the tone source 601 to prepare for transmitting the subsequent digits and to permit reliable detection at office A. After the identifying tones were transmitted, the tone source control circuit 700 releases and cannot be reactivated until this call has been disconnected.

Turning now to FIGS. 1–4 a description will now be given of the call tracing apparatus at the office whereby the nuisance call originated. It will be recalled that the office, associated with the customer originating nuisance calls, is furnished with equipment for scanning all trunks originating at that office for the purpose of detecting the presence of a nuisance call marking tone on these trunks.

More specifically, this circuitry comprises a clock and scanner circuit 401 in FIG. 4 which actuates trunk cut-in gate circuits such as gates 102–105 associated with the trunks in FIG. 1. Clock pulse source 405 furnishes driving pulses through gate 407 to a 50-stage ring counter 406. To simplify the drawing ring counter 406 has been shown in block diagram form and it will be realized that many of the well-known counters found in the prior art can be utilized in our invention. Examples of such counters are found in Patent 2,812,385 to A. E. Joel, Jr., et al. of Nov. 5, 1957, and the A. E. Joel, Jr., patent is hereby incorporated by reference as though fully disclosed herein.

Ring counter 406 counts at the rate of 50 pulses per second so that all trunks are scanned at least once every second, and each trunk cut-in gate is enabled for approximately 20 milliseconds in which time the presence of the nuisance call marking tone can be detected. The outputs of ring counter 406 are connected through high fan-out gates 4HF0–4HF49 capable of controlling 40 or more trunk cut-in gates. In this manner, all trunk blocks in the system can be scanned simultaneously.

Assuming that ring counter 406 is applying the appropriate pulses to conductors 0 through 49 in cable 1–4, gates 102 through 105 will be successively enabled to permit the interrogation of each trunk for the presence of the nuisance call marking tone.

It will be recalled that customer 508 actuated the call tracing apparatus at office B which placed a nuisance call marking tone back over the tip and ring conductors to trunk equipment 108 in office A. This tone was transmitted over the trunk for a sufficient interval of time (1 second) to permit its detection during one complete scanning cycle of the 50 trunks in each trunk block.

As set forth in this embodiment, each group of 50 trunks is associated with a receiver circuit such as receivers 200 and 201.

When a scanning pulse from ring counter 406 is transmitted over conductor 0 in cable 1–4, individual gates 111–114 in trunk block O are enabled and gates 113 and 114 extend the tip and ring conductors of the trunk, over conductors 115 and 116 in cable 1–2 to receiver circuit 200 in FIG. 2.

As was set forth in the F. T. Boesch et al. Patent 3,128,346 discussed above, receiver circuit 200 receives a plurality of tone bursts wherein each tone burst comprises two frequencies, one from a high frequency group F1–F4, and one from a low frequency group F1'–F4'.

The frequencies are separated by band filters 217 and 218 into their respective high and low bands, and if both frequencies appear coincidentally and are of a sufficient duration, appropriate detector circuits 219 through 225 are actuated in the receiver to furnish ground on one of the high group output leads HG1–HG4 and one of the low group output leads LG1–LG4 shown in FIG. 2.

It will be recalled that the nuisance call marking tone transmitted from office B comprises frequencies F4 in the high group and F3' in the low frequency band. In response to the receipt of these frequencies, receiver circuit 200 grounds conductors HG4 and LG3 in cable 2—2 to steering and register circuit 202.

Ground on conductor HG4 is extended through normal contacts of relay 3ETT and through the winding of relay 2HG4 to battery operating relay 2HG4. Similarly, ground on conductor LG3 is extended through normal contacts of relay 3ETT and through the winding of relay 2LG3 to battery operating relay 2LG3.

With relays 2HG4 and 2LG3 operated, ground is extended from normal contacts of relay 3RLS, over conductor 204, through operated contacts of relays 2HG4 and 2LG3, over conductor 205 in cable 1–2 to FIG. 1, through enabled gate 112 and over conductor 116 to the sleeve conductor of trunk 108. This ground in parallel with the ground from contacts of relay 1S1 in the trunk will prevent the established connection between calling station 106 and trunk 108 from releasing should the calling party attempt to disconnect before the call is traced. The same ground through the contacts of relays 2LG3 and 2HG4 is extended through diode 227, over conductor 206 to FIG. 4 to inhibit gate 407 thereby blocking the clock pulses from ring counter 406 to prevent further scanning of trunks.

The tone receiver circuit 200 is arranged with a checking circuit to vertify the operation of only one detector in each of the high and low frequency groups. To provide protection against digit simulation the validity of the signal is checked for a given interval of time as determined by signal validity check circuit 228 in receiver 200. If a valid signal persists for the required time period, check circuit 228 connects ground over conductor 207 in cable 2—2 to operate steering relay 2STR in steering and register circuit 202. A more detailed explanation of the signal check circuit is given in the F. T. Boesch et al. Patent 3,128,349 mentioned above and need not be reiterated herein for a complete understanding of our invention.

Relay 2STR in operating as a result of detecting a valid "marking" signal, extends the ground previously traced to conductor 205, through operated contacts of relay 2STR and through the winding of relay 2LTT to battery. Relay 2LTT operates and locks through its own contacts to ground on conductor 204 and also furnishes a ground for locking relays 2HG4 and 2LG3 operated.

At the end of the nuisance call marking tone or at the end of a time interval determined by the signal validity check circuit 228 in receiver 200 ground is removed from conductors 207 to release steering relay 2STR in FIG. 2 and prepare the steering and register circuit 202 for the receipt of the four digits (4307) which identify the called customer 508 at office B.

With relay 2STR released ground is closed through its normal contacts, over conductor 308 through operated contacts of relay 2LTT and through the winding of relay 3ETT to battery, operating relay 3ETT. Relay 3ETT locks through its own contacts to ground on conductor 209 from the normal contacts of relay 3RLS in FIG. 2. Relay 3ETT in operating also transfers output leads HG4 and LG3 to the windings of the high and low group registration relays 2AH4 and 2AL3, respectively.

The steering and register circuit 202 is now prepared to register the first digit (4) identifying the office "B" as it is transmitted from the called office. Upon receipt of the digit "4" receiver 200 grounds output leads HG3 and LG3 to operate relays 2AH3 and 2AL3, respectively.

A validity check of the tone burst is once again made by validity check circuit 228 in tone receiver 200, and if a valid tone burst has been received, receiver 200 extends ground over conductor 207 to operate steering relay 2STR. Operated relay 2STR extends ground over conductor 310, through operated contacts of relay 3ETT and through the winding of relay 3LT1 to battery thereby operating relay 3LT1. Relay 3LT1 extends the ground on conductor 204, to conductor 211 to furnish a locking path for registration relays 2AL3 and 2AH4 which represent the digit "4."

At the end of the tone burst representing the digit "4" steering relay 2STR is once again released, and in releasing, relay 2STR extends ground over conductor 312, through operated contacts of relay 3LT1 and through the winding of relay 3ET1 to battery operating relay 3ET1. In operating, relay 3ET1 transfers the high and low group output leads HG1–HG4 and LG1–LG4 from the windings of relays 2AH– and 2AL– to the windings of relays 2BH– and 2BL–, respectively, in preparation for registering the next digit "3."

Upon receipt of the digit "3" comprising frequencies F1 and F4′ receiver 200 grounds output leads HG1 and LG4 to operate registration relays 2BH1 and 2BL4 in steering and register circuit 202. After a proper tone validity check is again made by receiver check circuit 228, steering relay 2STR is reoperated and relay 2STR extends ground over conductor 313 through operated contacts of relay 3ET1 and through the winding of relay 3LT2 to battery thereby operating relay 3LT2. In FIG. 2 relay 3LT2 extends ground from conductor 204 over conductor 214 to lock operated the second set of registration relays 2BH1 and 2BL4.

Subsequent to the removal of the tone representing the digit "3" relay 2STR once again releases to prepare the steering and register circuit for the receipt of the third and fourth digits 0 and 7. Digits 0 and 7 are stored on registration relays 2CH2, 2CL1, and 2DH3, 2DL2, respectively in the same manner that the first two digits were stored on relays 2AH–, 2AL–, 2BH– and 2BL– described above.

When the register relays for the last digit have been satisfactorily locked operated by relay 3LT4, relay 1SC in gate circuit 102 is energized to put a holding condition on trunk 108 independent of steering and register circuit 202, and in addition, steering and register circuit 202 bids for access to call identity recorder 400 through preference and lockout circuit 408. Ground through normal contacts of relay 3RLS, through operated contacts of relay 3LT4 is extended over conductor 301 to FIG. 2, through cable 1–2 to gating circuit 102 in FIG. 1, through enabled gate 111 and through the winding of relay 1SC to battery, operating relay 1SC. In operating, relay 1SC extends ground over conductor 116 to the sleeve conductor of trunk 108 to hold up the connection to calling customer 106 should customer 106 try to disconnect. In addition, relay 1SC locks through its own contacts and through normal contacts of release key 215.

Ground from the normal contacts of relay 3RLS and operated contacts of relay 3LT4 is also extended over start conductor 300 to the preference and lockout circuit 408 in FIG. 4. Since call identity recorder 400 is arranged to function with many steering and register circuits, such as circuits 202 and 203 in FIG. 2, preference and lockout circuit 408 is arranged to permit only one register circuit at a time to be connected to the call identity recorder.

When call identity recorder 400 becomes available for connection, preference and lockout circuit 408 actuates the appropriate connector 409 for passing the stored information to the register circuit 404 and the printer circuit 402 in the call identity recorder.

Ground from contacts of the 2AL–, 2AH–, 2BL–, 2BH–, 2CL–, 2CH–, 2DL–, and 2DH– register relays in FIG. 3 is extended over the appropriate conductors in cables A, B, C, and D through connector 409 to register 404 thereby transferring the identity of the annoyed customer 508 to register 404 for subsequent entry on some form of printed media.

Ground is also extended from connector 409 over conductor TBO indicating to register circuit 404 that the nuisance call originated on a trunk in trunk block O. In addition, a potential on conductor 411 from ring counter 406 indicates to register 404 the particular trunk in trunk block O over which the call was made.

Register circuit 404 also comprises a clock for registering the time of day and this information is printed by printer 402 along with the called customer's identity and the trunk identity.

After the information has been registered in register circuit 404 ground is transmitted over conductor 412 through connector 409 to preference and lockout circuit 408 over conductor 413 to FIG. 3 and through the winding of relay 3RLS to battery operating relay 3RLS. Relay 3RLS, in operating, removes ground from start lead 300 to release preference and lockout circuit 408 thereby permitting call identity recorder 400 to be seized by other steering and register circuits, and relay 3RLS removes ground from conductor 301 to interrupt the operating path for relay 1SC in gate circuit 102. Relay 1SC, however, remains locked operated to release key 215 to give the maintenance man at office A sufficient time to trace the connection.

With relay 3RLS operated, the locking circuits for relays 2LTT, 3ETT, 3ET1–3ET3, 3LT1–3LT4 and all registration relays 2AL–, 2AH–, 2BL–, 2BH–, etc., are interrupted, releasing these relays and restoring steering and register circuit 202 to normal. Relay 3RLS also removes ground from conductor 206 to enable gate 407, and when gate 407 is enabled clock pulses from source 405 are effective to start ring counter 406 and continue the scanning of trunks for the presence of nuisance call marking tone.

While the arrangement described above contemplates the manual tracing of the connection at office A it will be obvious to one skilled in the art that automatic identification of the calling party is possible with automatic number identification systems which are well known in the art.

For example, when steering and register circuit 202 bids for access to call identity recorder 400, ground is extended over conductor 301 to actuate relay 1SC in gate circuit 102. This ground can also actuate identifier control 120 over conductor 121, and identifier control places an identifying tone through coil 117 and over the sleeve of the connection at office A. The tone is received by automatic number identification equipment 118 from the terminal associated with station 106, and identification of the calling line is made. The calling line number is then registered in calling line register circuit 119 for subsequent printout by printer 402.

Suitable automatic number identification systems for use with our invention are well known as exemplified in Patent 3,071,650 to H. D. Cahill and C. H. Dagnall, Jr., of January 1, 1963, and the Cahill-Dagnall patent is hereby incorporated by reference as though fully disclosed herein.

In addition to identifying the station from which the call originated it is sometimes desirable to obtain a sample of speech for possible voiceprint identification.

The technique of identifying persons through the study of voice spectrographs has been described in an article by L. G. Kersta published in the December 29, 1962, issue of Nature (volume 196, No. 4861, pages 1253–1257), MacMillan and Company, Ltd.

As set forth in the Kersta article the human voice has certain characteristics which cannot be imitated or disguised. It is possible with the techniques used by Kersta to make graphic representations of the voice so that the characteristics individual to the speaker can be studied and compared with voice samples of known origin. In this manner it is often possible to identify the caller by a "voiceprint" in a manner similar to the identification of persons through finger printing techniques.

In accordance with the present invention when relay 3LT4 operated upon registration of the last digit which identified the called customer, ground in FIG. 4 is extended over conductor 421 to operate relay 4TRT. Relay 4TRT locks through its own contacts to ground through normal contacts of release tape recorder relay 4RTR. Relay 3LT4 also extends ground from normal contacts of relay 3RLS in FIG. 3, over conductor 301, over conductor 414 in cable 2–4 to enable gate 415. When gate 415 is enabled, transmission conductors 416 from receiver 200 are extended to the recording mechanism of tape recorder 417 and a speech sample of the nuisance call is recorded thereat. The operation of relay 4TRT extends ground through normal contacts of relay 4RTR, over conductor 418 to disable gate 407 and prevent ring counter 406 from beginning a new scanning cycle until the voice sample has been taken.

The ground on conductor 418 also triggers timer 419, and after a 1- to 2-minute delay, timer 419 operates relay 4RTR which releases relay 4TRT to disconnect the tape recorder from receiver 200 and enable gate 407 to permit ring counter 406 to continue scanning. The tape is indexed over conductor 430 by clock 405 in such a manner that the voice sample can be associated with the information printed by printer 402.

It is to be understood that the above-described arrangements are merely illustrative of the application of the principles of the invention. Numerous other arrangements may devised by those skilled in the art without departing from the spirit and scope of the invention.

What is claimed is:

1. In a telephone system, a plurality of lines, a plurality of communication channels, switching equipment responsive to a service request signal over a calling one of said lines for interconnecting one of said channels between said calling line and a called one of said lines, means controlled by said lines for releasing said channel, means controlled by said called line for transmitting over said channel to said calling line a signal identifying said called line, means for scanning said channels for the presence of said identifying signal, and means effective upon the detection of a channel having said identifying signal thereon for disabling said channel releasing means and for recording indicia in accordance with the identifying signal of said called line.

2. In a telephone system, a plurality of lines; a plurality of communication channels; switching equipment responsive to a service request signal over a calling one of said lines for interconnecting one of said channels between said calling line and a called one of said lines; means controlled by said lines for releasing said channel; means controlled by said called line for transmitting over said channel to said calling line a signal identifying said called line; means for scanning said channels for the presence of said identifying signal; and means effective upon the detection of a channel having said identifying signal thereon for disabling said channel releasing means, for identifying said detected channel and for recording indicia in accordance with the identifying signal of said called line.

3. In a telephone system, a plurality of lines; switching means including a plurality of communication channels and means responsive to a service request signal over a calling one of said lines for interconnecting one of said channels between said calling line and a called one of said lines; means controlled by said lines for releasing said channel; means controlled by said called line for transmitting over said channel a signal identifying said called line and a marking signal; means for scanning said channels for the presence of said marking signal; and means effective upon the detection of a channel having said marking signal thereon for disabling said channel releasing means, for recording indicia identifying the particular channel containing said marking signal, and for recording information indicative of said called line as determined by said identifying signal.

4. In a telephone system, a plurality of switching offices each having local lines terminated thereat; trunks terminated at said offices; switching means at each said office comprising means responsive to a service request signal on a calling line terminated at a first one of said offices for establishing a trunk connection between said calling line and a called line terminated at a second one of said offices, and means controlled by said calling and called lines for releasing said connection at each said office; means controlled by said called line for transmitting a plurality of signals over said trunk connection to said first office, said signals comprising a signal identifying said called line and a signal marking said trunk; means at said first office for scanning said trunk terminals for the presence of said marking signal; and means responsive to the detection of said marking signal for disabling said first office trunk releasing means and for registering said called line identifying signal.

5. In a telephone system, a plurality of customer lines; a plurality of communication channels; switching equipment responsive to a service request signal over a calling one of said lines for extending a connection over one of said channels to a called one of said lines; means controlled by each of said lines for releasing said channel; circuit means coupled to said called line comprising means for transmitting over a channel connected to said called line a signal identifying said called line and a special signal, means for disabling said transmitting means and means for enabling said transmitting means upon receipt of a call from a calling line; means for scanning said channels for the presence of said special signal; means effective upon the detection of said special signal on one of said channels for registering the identity of said channel, for registering the identity of said called line and for disabling the channel releasing means controlled by said calling customer.

6. In a telephone system, a plurality of customer lines, a plurality of communication channels, switching means for interconnecting a calling one of said lines with a called one of said lines over one of said channels, means controlled by each of said connected lines for releasing said channel, holding means for disabling the channel releasing means controlled by said calling line, means coupled to said called line and effective upon the receipt of a call over one of said channels for transmitting over said channel a signal for marking said channel and a signal for identifying said called line, means for successively interrogating each said channel for the presence of said marking signal, means effective upon the detection of said marking signal on said marked channel for blocking said interrogating means and for placing said marked channel releasing means under control of said interrogating means, register means effective when said interrogating means is blocked for registering said called line identifying signals and for registering the identity of said marked channel, and means controlled by said register means for unblocking said interrogating means and for placing said channel releasing means under the control of said holding means.

7. In a telephone system, a plurality of customer lines each having a station thereon; a plurality of communication channels; switching means for interconnecting any calling one of said lines with a called one of said lines over one of said channels; means controlled by each of said connected lines for releasing said channel; and means for ascertaining the particular calling line connected over said channel to said called line comprising circuit means responsive to a coded signal from said called station for transmitting a predetermined sequence of tones over said channel, said tones including a tone for marking said channel and a tone for identifying said called line, means for scanning said channels for the presence of said marking tone, detecting means coupled to said scanning means and effective upon the detection of said marking tone for locking said scanning means to said marked channel to block the release thereof, means responsive to said detecting means for recording data representative of said called line identifying signals and data identifying said marked channel, and means effective when said data is recorded for unlocking said scanning means and for blocking the release of said channel independent of said detecting means.

8. In an arrangement for determining the origin of telephone calls, a switching system comprising a plurality of customer lines, communication channels, switch means for interconnecting said lines over said channels and means controlled by said lines for releasing the channel connected thereto; first circuit means associated with a called one of said lines comprising means effective when actuated for transmitting a tracing tone over a channel connected to said called line and means responsive to a coded signal over said called line when connected to said channel for actuating said transmitting means; said tracing tone comprising a signal for identifying said called line and a signal for marking the channel connected to said called line; second circuit means comprising receiver means, gating means coupled to each said channel, and scanning means for sequentially enabling said gating means for interconnecting each said channel one at a time to said receiver means; said receiver means comprising means responsive to the presence of said marking signal on one of said channels for blocking said scanning means and for disabling the releasing means of said marked channel; and means effective when said scanning means is disabled for registering indicia in accordance with said called line identifying signal.

9. The invention defined in claim 8 wherein said customer lines include stations connected thereto, wherein said coded signal comprises dial pulse signals transmitted by said called customer station, wherein said actuating means comprises means only responsive to a predetermined number of dial pulse signals for actuating said tone transmitting means, and wherein said tone transmitting means comprises means for transmitting particular marking and identifying signals independent of said dial pulse signals.

10. The invention defined in claim 9 wherein said communication channels include trunk circuit means adapted to apply a ringing signal to said called line, and wherein said actuating means further comprises means for blocking dial pulse signals from said pulse responsive means and means responsive to said ringing signal for enabling said pulse responsive means to receive said dial pulse signals.

11. The invention defined in claim 9 wherein said signals comprise multifrequency tone bursts, and wherein said tone transmitting means further comprises oscillator means and control circuitry for causing said oscillator means to produce different tone bursts in a predetermined sequence.

12. The invention defined in claim 11 wherein said control circuitry includes means for selectively altering said tone sequence in accordance with the customer line associated therewith.

13. An arrangement for determining the origin of telephone calls comprising a switching network comprising a first office including calling lines, a second office including a called line, trunks having terminals at each said office, means at each said office for establishing connections between a line and trunk terminal thereat, and means controlled by said lines for releasing said trunk connections; circuit means at said second office responsive to the connection of one of said trunks to said called line for transmitting a plurality of signals over said trunk to said first office; said signals comprising a signal for marking the connected trunk, a signal for identifying said second office, and a signal for identifying said called line; circuit means at said first office responsive to said marking signal for identifying at said first office the trunk terminal of said marked trunk and for blocking said releasing means; register means controlled by said first office circuit means for registering data in accordance with said identifying signals from said second office; and means effective when said data is registered for identifying the calling line at said first office.

14. The invention defined in claim 13 wherein said first office circuit means comprises signal detecting means responsive to said marking signal, gating means connected to each said trunk, and means for sequentially enabling each said gating means to connect the corresponding trunk to said signal detecting means.

15. The invention defined in claim 14 wherein said trunks comprise speech paths between said offices, wherein said signals comprise multifrequency signals adapted to be transmitted over said speech paths in a sequence determined by said second office circuit means, wherein said detector comprises a multifrequency receiver, and wherein said register means includes a plurality of registers and means for connecting said receiver in sequence to certain of said registers for registering said second office identifying signal and to other of said registers for registering said called line identifying signal.

16. The invention defined in claim 14 wherein said gate enabling means comprises a stepping circuit having a plurality of output circuits each for enabling a corresponding trunk gating means and means for sequentially advancing said stepping circuit to energize each said output circuit, and wherein each said trunk identifying means includes a particular one of said energized output circuits.

17. In an arrangement for determining the origin of telephone calls, a switching network comprising a first office including calling lines, a second office including a called line, trunks interconnecting said offices, means at each said office for establishing communication channels between lines and trunks thereat and means controlled by said lines for releasing said channels; circuit means at said second office controlled by said called line in response to a call over a trunk from said first office for transmitting a plurality of tone bursts over said trunk to said first office; said tone bursts comprising a first tone for marking said trunk, a second tone for identifying said second office, and a third tone for identifying said called line; means at said first office for scanning said trunks for detecting the presence of said first tone; means effective when said first tone is detected for recording indicia in accordance with said second and third tones and for disabling said channel releasing means; and means effective when said indicia is recorded for identifying the calling line connected to said marked trunk and for recording a speech sample of any voice on said marked trunk.

References Cited

UNITED STATES PATENTS

| | | | |
|---|---|---|---|
| 2,077,537 | 4/1937 | Taylor | 179—27.12 |
| 2,879,338 | 3/1959 | Joel | 179—18.61 |
| 3,137,770 | 6/1964 | Doyle | 179—18.61 |

KATHLEEN H. CLAFFY, *Primary Examiner.*

A. H. GESS, *Assistant Examiner.*